A. J. ANDERSON.
COUPLING ATTACHMENT.
APPLICATION FILED JAN. 20, 1919. RENEWED NOV. 12, 1919.
1,336,181.
Patented Apr. 6, 1920.
2 SHEETS—SHEET 1.
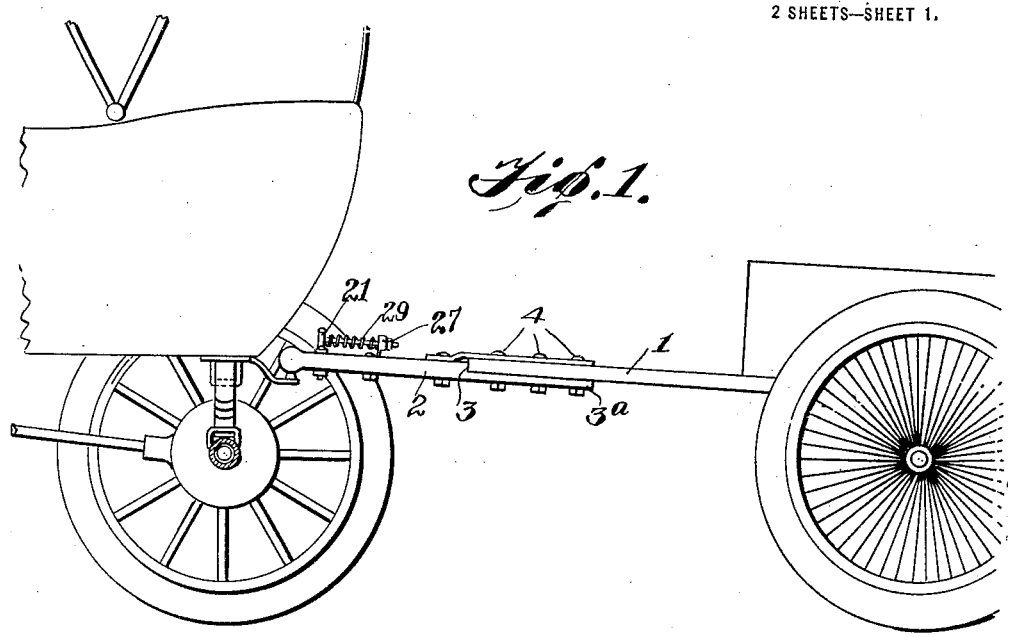
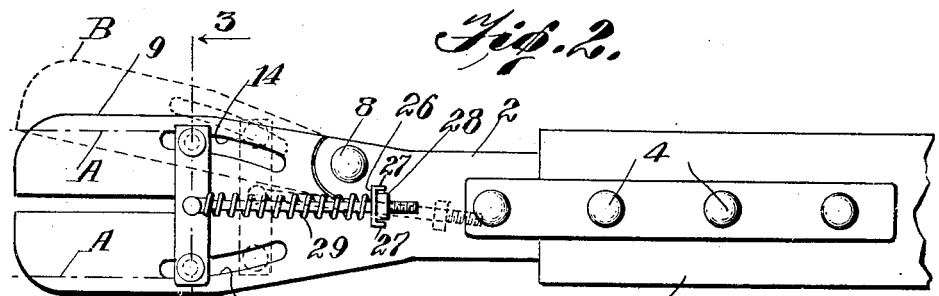
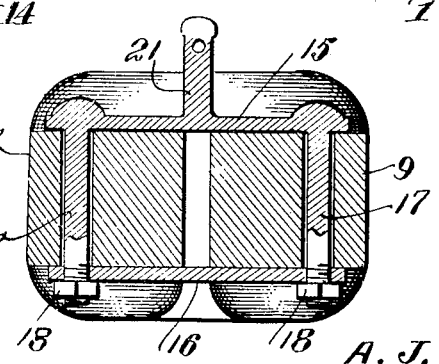
Inventor
A. J. Anderson
his Attorneys A. J. ANDERSON.
COUPLING ATTACHMENT.
APPLICATION FILED JAN. 20, 1919. RENEWED NOV. 12, 1919.
1,336,181. Patented Apr. 6, 1920.
2 SHEETS—SHEET 2.
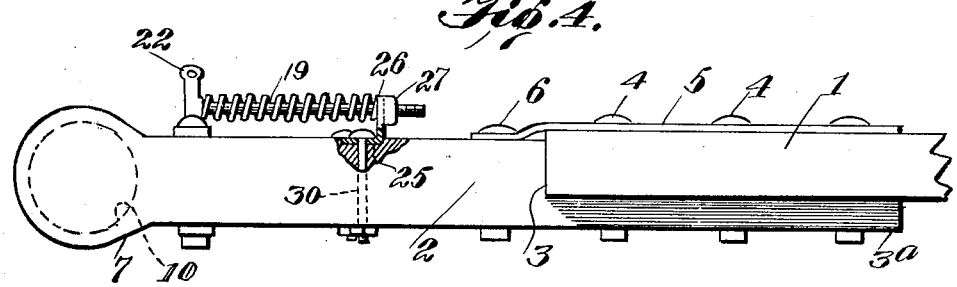
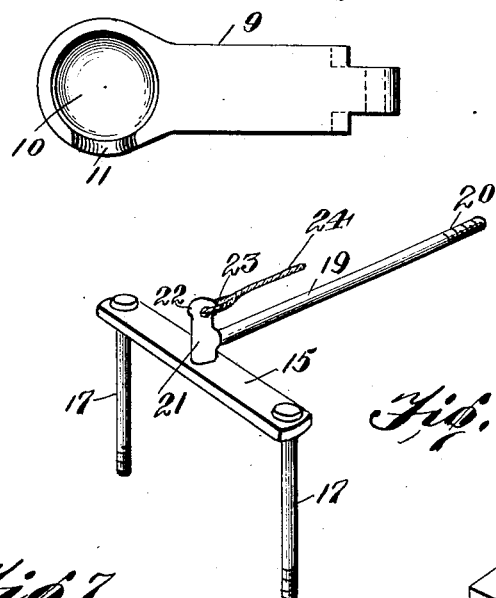
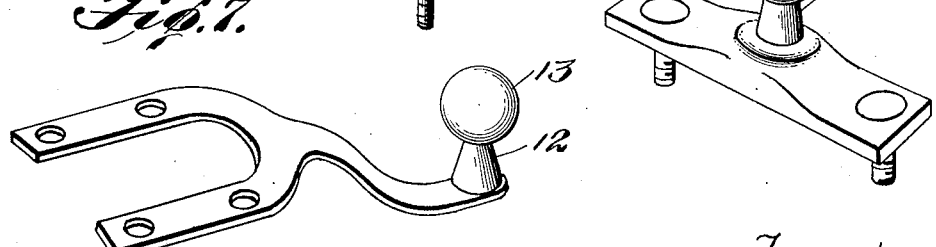
Inventor
A. J. Anderson.
By his Attorneys

UNITED STATES PATENT OFFICE.

ALBERT J. ANDERSON, OF LA CROSSE, WISCONSIN.

COUPLING ATTACHMENT.

1,336,181. Specification of Letters Patent. Patented Apr. 6, 1920.

Application filed January 20, 1919. Serial No. 272,098. Renewed November 12, 1919. Serial No. 337,619.

*To all whom it may concern:*

Be it known that I, ALBERT J. ANDERSON, a citizen of the United States, residing at La Crosse, in the county of La Crosse and State of Wisconsin, have invented certain new and useful Improvements in Coupling Attachments, of which the following is a specification, reference being had therein to the accompanying drawings.

This invention relates to a coupler, and has for its object the production of a simple, convenient, and efficient coupler, which may be used for the purpose of connecting two vehicles, or machines, such, for instance, as connecting a trailer with an automobile, or other propelling vehicles.

Another object of my invention is the production of a simple and efficient coupler which is capable of being used for a number of purposes wherein it is desired to connect two vehicles together.

With these and other objects in view, my invention comprises certain novel constructions, combinations, and arrangements of parts as will be hereinafter fully described, illustrated in the accompanying drawings, and more particularly pointed out in the appended claims.

In the drawings:

Figure 1 is a view in side elevation of my improved coupler showing the same connecting an automobile and a trailer.

Fig. 2 is a top plan view of my coupler.

Fig. 3 is a section taken on line 3—3, Fig. 2, and looking in the direction of the arrows.

Fig. 4 is a view in side elevation of the coupler.

Fig. 5 is a view in elevation of the pivoted or auxiliary jaw of the coupler.

Fig. 6 is a perspective view of part of the clamping device of the coupler.

Fig. 7 is a perspective view of the automobile knob plate.

Fig. 8 is a perspective view of another embodiment of a knob plate.

Referring to the drawings by numerals, 1 designates a tongue or draw-bar of a trailer, a mower pitman, buggy shafts, hay loader tongue, or any object that is found convenient to couple to another object. The coupler body 2 is provided with a cut-out portion 3 upon the upper part thereof for producing an underhanging finger 3ª. Through this finger 3ª and the tongue 1, extend bolts 4 for fastening the body of the coupler to the tongue 1.

A strap 5 is fastened by bolts 4 to the tongue 1 and the forward end of the strap is bent down against the body 2 of the coupler, and is fastened by a bolt 6 securely to the body 2.

Fixedly attached to the body 2 is the primary or stationary jaw 7, and pivotally mounted upon the bolt 8 and coöperating with jaw 7 is the pivoted or auxiliary jaw 9. Each jaw is provided with a concave socket 10 (Fig. 5), and at the bottom of the sockets are notches or enlarged openings 11, which notches or enlarged openings 11 receive the neck 12 of the knobs 13 of the knob devices, the knobs 13 being normally situated in the sockets when the coupler device is coupling a motor vehicle and a trailer or like objects together (Fig. 1).

Each jaw is provided with a slot 14 extending substantially longitudinally of the jaw; each slot has its inner end extending inwardly and its outer end is parallel with the outer end of the other slot as is indicated by dotted lines A (Fig. 2) for the purpose hereinafter described.

The clamping device comprises a primary plate 15 and an auxiliary plate 16; these plates are positioned transversely of the jaws 7 and 9. Fixedly secured to the primary plate 15 are vertically-extending bolts 17 (Fig. 3); these bolts extend through the auxiliary plate 16, and by means of nuts 18 the auxiliary plate is retained upon the bolts. These bolts 17 slide within the elongated slots 14 for either securely retaining the pivoted jaw 9 in a closed position with respect to the fixed jaw 7, or for opening the jaw 9 to the dotted position B shown in Fig. 2. A bolt 19 is provided with an inner threaded end 20 and integral with the outer end is a head 21, which head has its lower end integrally secured to the primary plate 15. The upper end of the head 21 is provided with an aperture knob 22, which knob is adapted to receive an eye 23 or like device, whereby a rope or cable 24 can be attached to the head 21 for facilitating the opening of the jaw 9.

Contiguous to the rear ends of the jaws, and mounted upon the body 2, is an angle bracket 25, which bracket has an upstanding aperture portion 26 through which extends the bolt 19; the up-standing or vertical portion 26 is provided with parallel vertical ears 27, between which ears nut 28 on the threaded end 20 of the bolt 19 is normally positioned, preventing the nut 28 from being accidentally displaced, but by drawing inwardly on the knob 21 the nut is freed from the ears 27 (Fig. 2), allowing the nut to be rotated for controlling the tension of the coil spring 29, which spring 29 is mounted upon the bolt 19 between the head 21 and the up-standing portion 26 of the bracket 25. The bracket 25 is secured to the body 2 by means of the bolt 30 (Fig. 4).

When it is desired to attach, for instance, a trailer to an automobile, it is first necessary to fasten the knob plate shown in Fig. 7 to the body of the machine as illustrated, for example, in Fig. 1; the coupler being already attached to the tongue of a trailer, all that is necessary to do is to draw inwardly upon the head 21, causing the bolts 17 to slide inwardly in the elongated slots 14, opening the jaws, by swinging the auxiliary jaw outwardly to the position shown in Fig. 2, then placing the knob 13 between the jaws, and seated in the sockets 10, and upon releasing the head, the coil spring 29 will force the clamping device outwardly, resulting in the bolts 17 riding forwardly in the slots 14 and being positioned finally in the parallel ends of the slots, thereby preventing any accidental opening of the jaw or jaws, as the bolts will be in the parallel ends and consequently not readily riding backward in the slots, until manual strain is placed upon the head 21 resulting in an inward drawing action on the bolts, overcoming the resistance of the coil 29, and opening the jaw or jaws to release the coupler from the knob plate attached to the automobile.

The modification shown in Fig. 8 of the knob plate illustrates a device that can be attached to tongues or pitman rods or to other objects that are to be attached to another object by means of my coupler.

It will be understood that nut 28 is an adjustable tightener. By loosening nut 28, the spring 29 is allowed to force plate 15 and bolts 17 forwardly, the bolts 17 riding in the slots 14.

From the foregoing description, it will be understood that I have produced a simple and efficient coupler, and I reserve the right to make certain alterations and changes in the construction of my coupler as shall fairly fall within the scope of the appended claims.

What I claim is:

1. In a coupler of the class described, the combination with a body, a primary jaw secured to said body, of an auxiliary jaw pivotally mounted upon said body, said jaws each provided with an elongated curved slot, the outer ends of the slots being in parallelism when the auxiliary jaw is in a closed position with respect to the primary jaw, and means working in said slots and being adapted to open the auxiliary jaw or hold the auxiliary jaw securely closed with respect to the primary jaw when the operating means is in the parallel outer end portions of the slots.

2. In a coupler of the class described, the combination with a body, a fixed and a pivoted jaw carried by said body, of a clamping device slidably mounted on the body and jaws and including a plate riding upon the jaws and provided with means extending into the jaws, a bracket secured to the body, a bolt slidably mounted upon said bracket and connected to said plate, and yielding means mounted upon the bolt between the bracket and the connecting means of the bolt and plate.

3. In a coupler of the class described, the combination with a body, a fixed and a pivoted jaw carried by said body, of a clamping device carried by said body and jaws, said clamping device comprising a primary plate provided with means extending into the jaws, said extending means being slidably mounted upon the jaws for opening and closing the pivoted jaw, an angle bracket provided with an up-standing portion, secured to the body, a bolt extending through the up-standing portion of said bracket and provided with a head at one end, said head secured to the plate, and a coil spring mounted upon the bolt between the up-standing portion of the bracket and the head.

4. In a coupler of the class described, the combination with a body, a fixed and a pivoted jaw carried by the body, each jaw provided with a slot, of a primary and an auxiliary plate positioned against the jaws and extending transversely thereof, bolts extending through the slots of the jaws and connecting said plates, a bracket secured to said body, a bolt supported near one end upon said bracket and being connected at its outer end to said primary plate, and a spring engaging said bolt and positioned between the bracket and the outer end of the bolt.

5. In a coupler of the class described, the combination with a body, a fixed and a pivoted jaw carried by said body, said jaws provided with elongated slots, of transverse primary and auxiliary plates mounted upon the jaws, means slidably mounted in the slots of the jaws and connecting said plates, a bracket secured to said body and provided with an up-standing portion having parallel ears, a bolt slidably mounted in the bracket and provided with an inner threaded end, a nut threaded upon said inner end and normally positioned between the ears of the bracket, said bolt having a head at its outer end connected to the primary plate, a knob formed upon said head, and a coil spring surrounding said bolt and positioned between the up-standing portion of the bracket and the head.

6. In a coupler, the combination with a body, of a stationary and a movable jaw carried by said body, said jaws provided with slots having their inner ends converging and their outer ends formed parallel, and means movably mounted in said slots and bodily-movable upon the jaws and body for opening the movable jaw and resting in the parallel ends of the slots for holding the movable jaw securely in a closed position with respect to the fixed jaw.

In testimony whereof I hereunto affix my signature.

ALBERT J. ANDERSON.